2,929,764

DEXTRAN GLUCOSIDES, PREPARATION THEREOF, AND BLOOD SUBSTITUTES CONTAINING THE SAME

Eskil Alexis Hultin and Sven Lennart Nordstrom, Stockholm, Sweden

No Drawing. Application April 15, 1954
Serial No. 423,542

Claims priority, application Sweden November 8, 1951

12 Claims. (Cl. 167—78)

This invention relates to the manufacture of new chemical compounds on the basis of dextran particularly useful in the preparation of infusion fluids adapted for replenishing or substituting blood and blood plasma in the human organism.

This application is a continuation-in-part of our prior co-pending application, Serial No. 315,832, filed October 20, 1952, now abandoned.

It is known to depolymerize dextran partially by treating aqueous solutions of said hydrocarbon with acids, alkalies or enzyms. Said depolymerization has the nature of hydrolysis and the short molecular chains formed in the decomposition have a free reducing glucose rest at one end. It is also known that partially depolymerized dextran obtained in said manner may be used in the manufacture of blood plasma substitute for which purpose the molecular weights of the dextran preferably shall be between 20,000 and 300,000.

It is further known to manufacture solutions adapted as blood plasma substitute from polysaccharides such as for instance gum arabic and dextran in such manner that a polysaccharide of suitable molecular size is dissolved in water to such concentration that the solution in respect of colloidosmotic pressure corresponds to that of blood plasma, and that a crystalloid substance, as for instance sodium chloride, is added in such quantity that the solution will be isotonic with blood plasma. It has also been proposed to manufacture blood plasma substitutes by using other substances than polysaccharides, such as polyvinyl alcohol and polyvinyl pyrrolidone. Said latter substances are synthetic and to their nature foreign to the human organism.

The polysaccharides hitherto proposed for the manufacture of blood plasma substitutes, such as gum arabic and the partially hydrolyzed hydrocarbons pectin, methyl cellulose and dextran, have a free saccharic aldehyde group and some of them possess free carboxy groups. Such polysaccharides are stored in certain internal organs, as for instance the spleen, some of them also in the liver. Even the partially decomposed dextran which hitherto has been considered as the best of said blood plasma substitutes, has been found under circumstances to give undesirable effects which seem at least in part to be caused by free biochemically reactive groups in the dextran molecule (JACS 74 (1952), 2126–2127).

It is the object of the present invention to provide a process of preparing a blood plasma that is neither foreign to the human organism nor causes any undesirable secondary effects as sometimes may be observed in using partially hydrolyzed dextran. The new preparation is obtained by preparing a physiological solution of sodium chloride with a content of dextran glucosides of suitable molecular size and giving the solution such concentration that its colloidosmotic pressure corresponds to that of blood plasma. The glucosides of dextran manufactured in the manner described herebelow do not possess any carboxy groups nor any free saccharic aldehyde groups and are, therefore, less reactive and more suitable for the preparation of blood plasma substitute than the partially depolymerized dextran hitherto used for such purpose. On account of their chemical constitution they do not possess the nature foreign to the human organism that is characteristic for polyvinyl alcohol, polyvinyl pyrrolidone, pectin and gum arabic.

The glucosides of dextran used according to this invention are manufactured by partial alcoholysis of dextran in such manner that the said hydrocarbon is heated together with an organic solvent therefor comprising a member selected from the group consisting of an alkyl polyol containing up to 3 carbon atoms in the molecule if desired in presence of an acid reacting compound in catalytical amounts. As specific examples of said alkyl polyols containing up to 3 carbon atoms in the molecule, glycerol, and ethylene glycol may be mentioned. Any acid reacting catalyst may be used but the following ones are preferred, viz. phosphoric acid, sulphuric acid, formic acid, and trichloroacetic acid. Resorcinal serves the double purpose of solvent and catalyst but can also be used as the catalyst with a polyhydric alcohol as the solvent.

Said alcoholysis also causes a partial depolymerisation of the dextran. It is also possible to control the reaction by measuring the viscosity of samples taken out at different times. Preferably the intrinsic viscosity $$[\eta] = \lim_{c \to 0} \frac{\ln \eta_r}{c}$$

$\eta_r$ being the relative viscosity and $c$ the concentration of the high molecular substance in the solution expressed in percent by weight, is calculated as said viscosity is proportional to the molecular weight. By controlling time, catalyst and temperature in carrying out the alcoholysis it is possible to obtain glucosides with any desired molecular weight. Such glucosides having molecular weights between 20,000 and 300,000 are particularly valuable for the manufacture of a blood plasma substitute.

The glucosides of dextran may be precipitated from their solutions by adding a suitable precipitant, as for instance methylalcohol, ethyl alcohol or acetone. By adding a suitable quantity of the precipitant a fraction of the glucosides having the molecular weight desirable for a certain purpose may be obtained.

The precipitated glucosides may be further purified by dissolving in water and renewed precipitation, for instance by means of any of the above-mentioned precipitants. The solutions of the glucosides may be purified by dialysis, if desired.

The following examples illustrate how the invention may be carried out in practice without limiting the same to the specific embodiments disclosed therein.

Example 1

A solution containing 10 percent by weight dextran in glycerol free from water was heated to 200° C. The intrinsic viscosity $[\eta]$ was reduced to 0.33 after 30 minutes, to 0.24 after 60 minutes and to 0.19 after 120 minutes, corresponding to molecular weights of 100,000, 75,000 and 60,000 respectively.

Example 2

A solution containing 10 percent by weight dextran in glycerol free from water was heated to 220° C. The intrinsic viscosity $[\eta]$ was lowered to 0.20 after 30 minutes, to 0.14 after 60 minutes and to 0.12 after 120 minutes, corresponding to molecular weights of 60,000, 45,000 and 35,000 respectively.

Example 3

To a solution containing 10 percent by weight dextran in glycerol free from water concentrated phosphoric acid was added in such quantity that the concentration of the acid in the solution amounted to 0.20 percent by weight, whereupon the solution was heated to 150° C. This intrinsic viscosity $[\eta]$ was reduced to 0.54 after 30 minutes, to 0.39 after 60 minutes and to 0.25 after 120 minutes, corresponding to the molecular weights 170,000, 120,000 and 80,000 respectively.

*Example 4*

To a solution containing 10 percent by weight dextran in glycerol free from water concentrated phosphoric acid was added in such quantity that the concentration of the acid in the solution amounted to 0.25 percent by weight, whereupon the solution was heated to 150° C. The intrinsic viscosity $[\eta]$ was lowered to 0.30 after 30 minutes, to 0.17 after 60 minutes and to 0.10 after 120 minutes, corresponding to molecular weights of 95,000, 55,000 and 30,000 respectively.

*Example 5*

To a solution containing 10 percent by weight dextran in glycerol free from water concentrated phosphoric acid was added in such quantity that the concentration of the acid in the solution amounted to 0.2 percent by weight, whereupon the solution was heated to 150° C. until the intrinsic viscosity $[\eta]$ had been lowered to 0.27. The mixture was diluted with 4 parts by volume of glycerol and then, after heating, absolute ethyl alcohol was added in such quantity that the percentage of alcohol in the solution amounted to 33.3 percent by weight, whereafter the mixture was left to cool. The pricipitate formed was separated from the solution, washed with alcohol and with ether and dried. In aqueous solution the fraction of dextran glycerol glucoside thus obtained had an intrinsic viscosity $[\eta]=0.53$. When the percentage of alcohol in the remaining reaction mixture was increased to 37.5 percent by weight a precipitate of glucoside with the intrinsic viscosity $[\eta]=0.37$ was obtained. In further increasing the percentage of alcohol to 41.2 percent by weight a precipitate of glucoside was obtained having the intrinsic viscosity $[\eta]=0.21$. The intrinsic viscosities of the precipitates correspond to molecular weights of 160,000, 110,000 and 65,000 respectively.

*Example 6*

To a solution containing 10 percent by weight dextran in glycerol free from water concentrated phosphoric acid was added in such quantity that the concentration of the acid in the solution amounted to 0.2 percent by weight. The solution was heated to 150° C. until the intrinsic viscosity had been reduced to 0.13. The mixture was then diluted with 4 parts by volume of glycerol and after heating absolute ethyl alcohol was added in such quantity that the percentage of alcohol in the solution amounted to 35.4 percent by weight whereupon the solution was left to cool at room temperature. The precipitate formed was separated, washed with absolute alcohol and with ether and dried. In an aqueous solution the glycerol glucoside thus obtained had the intrinsic viscosity $[\eta]=0.31$. When the percentage of alcohol in the remaining reaction mixture was increased to 37.5 percent by weight glucosides having an intrinsic viscosity $[\eta]=0.24$ were precipitated, and when the percentage of alcohol was further increased to 39.4 percent glucosides having an intrinsic viscosity $[\eta]=0.21$ were precipitated. When the percentage of alcohol was increased to 41.2 percent glucosides with an intrinsic viscosity $[\eta]=0.17$ were precipitated. The intrinsic viscosities of the precipitates correspond to molecular weights of 100,000, 75,000, 65,000 and 55,000 respectively.

*Example 7*

To a solution containing 10 percent by weight dextran in glycerol free from water concentrated phosphoric acid was added in such quantity that the concentration of the acid in the solution amounted to 0.2 percent by weight. The solution was heated to 150° C. until the intrinsic viscosity had been reduced to 0.13. The mixture was then diluted by 4 parts by volume of water and after heating absolute alcohol was added in such quantity that the percentage of alcohol in the solution amounted to 43.3 percent by weight, whereupon the solution was left to cool at room temperature. The precipitate formed was separated, washed with alcohol and with ether and dried. The fraction of glycerol glucosides thus obtained had in aqueous solution an intrinsic viscosity $[\eta]=0.29$. When the concentration of alcohol in the remaining reaction mixture was increased to 44.8 percent glucosides having the intrinsic viscosity 0.20 were precipitated, and when the percentage of alcohol was increased to 46.3% glucosides having an intrinsic viscosity $[\eta]=0.18$ were precipitated. The intrinsic viscosities of the precipitates correspond to molecular weights of 90,000, 65,000 and 55,000 respectively.

*Example 8*

To a solution of dextran in ethylene glycol free from water concentrated phosphoric acid was added in such quantity that the concentration of the acid in the solution amounted to 0.20 percent by weight, whereupon the solution was heated to 190° C. until the corresponding glucoside was formed.

*Example 9*

To solutions containing 5 percent by weight dextran in glycerol, sulphuric acid, formic acid, and trichloroacetic acid, respectively, were added in such quantity that the concentration of the acid in the soluton in each case amounted to 0.2 percent by weight. The mixtures were heated to 160° C. Dextran glycerol glucosides were formed, and after some minutes (when using sulphuric acid) and one hour (formic acid and trichloroacetic acid) respectively, the viscosity had been materially reduced. The reactions were interrupted when the desired final products had been formed.

*Example 10*

A mixture of polymeric homologues of dextran glucosides prepared according to any of the preceding examples and having an average molecular weight of 65,000 was dissolved in distilled water together with sodium chloride in such quantities that the solution contained 5.5 percent by weight dextran glucoside and 0.9 percent by weight sodium chloride. The solution thus obtained was an excellent blood plasma substitute.

What we claim is:

1. The process of preparing high-molecular glucosides of dextran, comprising dissolving dextran in a substantially water-free alkyl polyol containing up to 3 carbon atoms in the molecule, heating the solution thus obtained to an elevated temperature to cause the alkyl polyol to react with the dextran while degrading the dextran molecules with formation of dextran glucosides and continuing the heating until a molecular weight of 300,000 to 20,000 of the dextran glucosides has been obtained and recovering the dextran glucosides formed by precipitation.

2. The process according to claim 1, and in which the alkyl polyol is selected from the group consisting of glycerol and ethylene glycol.

3. The process according to claim 1, and in which an acid substance is added to the solution in an amount up to approximately 0.25% by weight to serve as a catalyst.

4. The process according to claim 1, and in which an acid substance is added to the solution in an amount up to approximately 0.25% by weight to serve as a catalyst, said acid substance being selected from the group consisting of phosphoric, trichloroacetic, formic, and sulfuric acid.

5. The process of preparing high-molecular glucosides of dextran, comprising dissolving dextran in glycerol in quantities to produce an approximately 10% solution, adding phosphoric acid as a catalyst in the amount of about 0.2% by weight, heating the solution thus obtained to an elevated temperature to cause the glycerol to react with the dextran while degrading the dextran molecules with formation of dextran glucosides and continuing the heating of the solution until a molecular weight of the dextran glycosides of 300,000 to 20,000 has been obtained.

6. The process according to claim 5 and in which the dextran glucosides produced are recovered by precipitation by adding a precipitating agent selected from the group consisting of ethyl alcohol, methyl alcohol and acetone.

7. The process according to claim 5, and in which the dextran glycosides produced are recovered by precipitation by adding in successive steps successively larger quantities of the precipitating agent to precipitate successively fractions of the glucosides of successively lower intrinsic viscosities.

8. The process according to claim 6 and in which prior to the addition of the precipitating agent, the solution is diluted with water.

9. As a new product of manufacture, dextran glucosides of a polyhydric alcohol containing up to 3 carbon atoms in the molecule, said glucosides having a mean molecular weight between 20,000 and 300,000.

10. A blood plasma substitute consisting essentially of an aqueous solution of sodium chloride in the amount of about 0.9 percent and about 5.5 percent of dextran glucosides of an alkyl polyol containing up to 3 carbon atoms in the molecule and having the same number of hydroxyl groups as carbon atoms, said glucosides having molecular weights between 20,000 and 300,000.

11. A blood plasma substitute consisting essentially of an aqueous solution of dextran glucosides of an alkyl polyol containing up to 3 carbon atoms in the molecule, said glucosides having molecular weights between 20,000 and 300,000 and said solution being of such a concentration that its colloidosmotic pressure is approximately equal to that of blood plasma.

12. A blood plasma substitute consisting essentially of an aqueous solution of dextran glucosides of an alkyl polyl containing up to 3 carbon atoms in the molecule, said glucosides having molecular weights between 20,000 and 300,000, and said solution being of such a concentration that its colloidosmotic pressure is approximately equal to that of blood plasma, and containing about 0.9% by weight of sodium chloride whereby the solution has a total osmotic pressure approximating that of blood plasma.

References Cited in the file of this patent

UNITED STATES PATENTS

| | | |
|---|---|---|
| 1,951,784 | Bertsch | Mar. 20, 1934 |
| 2,258,168 | White | Oct. 7, 1941 |
| 2,390,507 | Cantor | Dec. 11, 1945 |
| 2,437,518 | Gronwall et al. | Mar. 9, 1948 |
| 2,565,507 | Lockwood et al. | Aug. 28, 1951 |
| 2,644,815 | Gronwall et al. | July 7, 1953 |

OTHER REFERENCES

Vasseur: Chem. Abst., vol. 43, 1949, p. 3795.
Pigman: Carbohydrate Chemistry, 1948, p. 513.